United States Patent
Detwiler

(10) Patent No.: US 10,063,353 B2
(45) Date of Patent: Aug. 28, 2018

(54) INJECTED BLOCK CODE DISTORTION

(71) Applicant: Adtran, Inc., Huntsville, AL (US)

(72) Inventor: Thomas Detwiler, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 80 days.

(21) Appl. No.: 15/076,026

(22) Filed: Mar. 21, 2016

(65) Prior Publication Data

US 2017/0272212 A1    Sep. 21, 2017

(51) Int. Cl.
| | |
|---|---|
| *H04L 1/00* | (2006.01) |
| *H04L 1/24* | (2006.01) |
| *H04B 10/27* | (2013.01) |
| *H04L 25/02* | (2006.01) |

(52) U.S. Cl.
CPC ............ *H04L 1/242* (2013.01); *H04L 1/0041* (2013.01); *H04L 1/0042* (2013.01); *H04B 10/27* (2013.01); *H04L 1/004* (2013.01); *H04L 1/0083* (2013.01); *H04L 25/0262* (2013.01)

(58) Field of Classification Search
CPC ..... G06F 13/42; H04L 25/0262; H04L 1/004; H04L 1/0042; H04L 1/0083; H04L 1/0041
See application file for complete search history.

(56) References Cited

U.S. PATENT DOCUMENTS

| | | | | |
|---|---|---|---|---|
| 6,233,073 | B1* | 5/2001 | Bowers ................ | H04B 10/077 370/244 |
| 7,460,563 | B1* | 12/2008 | Boluna .................... | H04L 7/041 370/465 |
| 9,237,003 | B1* | 1/2016 | Chengson ............... | H04L 7/033 |
| 2005/0025195 | A1* | 2/2005 | Barrett .................. | H04L 1/0061 370/532 |
| 2005/0220233 | A1* | 10/2005 | King ....................... | H03L 7/113 375/354 |
| 2006/0129733 | A1* | 6/2006 | Sobelman ........... | H04L 25/0262 710/305 |
| 2014/0064744 | A1* | 3/2014 | Yoshiyama ............ | H04B 10/60 398/202 |
| 2016/0056980 | A1* | 2/2016 | Wang ................ | H04L 25/03057 375/233 |
| 2016/0261375 | A1* | 9/2016 | Roethig ................ | H04L 1/0083 |

* cited by examiner

*Primary Examiner* — Joseph O Schell

(74) *Attorney, Agent, or Firm* — Fish & Richardson P.C.

(57) ABSTRACT

Methods, systems, and apparatus for automatically injecting symbol errors into a data stream prior to transmitting the data stream for timing recovery robustness are disclosed. In one aspect, a first telecommunications device determines that a data transition rate of a data stream exceeds a pre-specified rate. In response to the determination that the data transition rate exceeds the pre-specified rate, the first telecommunications device injects symbol errors into the data stream prior to transmitting the data stream to a second telecommunications device. The pre-specified rate is based on at least a nominal passband of the second telecommunications device.

24 Claims, 6 Drawing Sheets

INJECTED BLOCK CODE DISTORTION

BACKGROUND

This specification relates to data transmission.

In a telecommunication network, for high-speed data communications without an accompanying clock signal, a receiver needs to recover a sampling clock (e.g., timing recovery) from an approximate frequency reference of a received data stream in order to recover data from the received data stream.

SUMMARY

In general, one innovative aspect of the subject matter described in this specification can be embodied in methods for automatically injecting symbol errors into a data stream prior to transmitting the data stream for timing recovery robustness. One example computer-implemented method includes the following: determining, by a first telecommunications device (e.g., a transmitter), that a data transition rate of a data stream exceeds a pre-specified rate, and in response to the determination that the data transition rate exceeds the pre-specified rate, injecting, by the transmitter, symbol errors into the data stream prior to transmitting the data stream to a second telecommunications device (e.g., a receiver).

These and other embodiments can each optionally include one or more of the following features. The pre-specified rate can be based on at least a nominal passband of the receiver. The injection of the symbol errors can include changing a logical value of one or more bits in the data stream to reduce the transition rate of the data stream. A data transition rate of the data stream with the injected symbol errors can be less than the pre-specified rate. The transmitter can be an optical line terminal (OLT), with a nominal data rate of 10 Gbps, and the receiver can be an optical networking unit (ONU), with a nominal data rate of 2.5 Gbps.

Methods can further include encoding, by the transmitter, data using a forward error correcting (FEC) coding having a plurality of codewords each having multiple data symbols and multiple parity symbols. The data stream can be part of multiple data symbols in a codeword of the plurality of codewords. The determination that the data transition rate of the data stream exceeds the pre-specified rate can include identifying a plurality of consecutive data symbols in the codeword. The plurality of consecutive data symbols can match one of a plurality of predetermined signal patterns. The plurality of predetermined signal patterns can include patterns having sequential high-low-high-low logic values. The injection of the symbol errors can include automatically replacing at least one data symbol in the identified plurality of consecutive data symbols in the codeword with the symbol errors. This is advantageous because the FEC coding can allow the receiver to repair data corruption in the received data stream, while the injected symbol errors can break high frequency content of data in the received data stream and make timing recovery robust at the receiver. As a result, an overall performance of high-speed data communications can be improved.

Methods can further include the following: progressing iteratively through following data symbols in the codeword from the identified plurality of consecutive data symbols, and transmitting the replaced codeword to the receiver. Maximum number of injected symbol errors in the codeword can be based on at least number of parity symbols in the codeword. The symbol errors can be injected at an end or in a middle of the identified plurality of consecutive data symbols in the codeword. Each symbol can have 8 bits. The symbol errors can provide symbol values of 00000000, 11111111, 00000001, or 11111110. This is advantageous because using byte boundary to inject symbol errors can reduce injected errors to a few bytes per FEC coding block (e.g., codeword). Since the FEC coding is insensitive to number of bit errors within a byte, as many bit errors as necessary can be included within an injected error byte to reduce the data transition rate of the data stream. As a result, using byte boundary to inject symbol errors may greatly reduce incidence of timing recovery failure at the receiver, while minimizing effect on coding gain at the receiver.

Particular embodiments of the subject matter described in this specification can be implemented so as to realize one or more of the following advantages. Automatically injecting symbol errors into a high frequency data stream can provide timing recovery robustness at a receiver, especially when the receiver has a nominal operating bandwidth that is less than a nominal operating bandwidth of the transmitter. This enables legacy equipment, which may have a 2.5 Gbps receiver optical component to realize a 10 Gbps communication rate with currently deployed equipment having a 10 Gbps transmitter optical component, to operate at its specified operating ranges and to be able to perform timing recovery even with the presence of high frequency content of data. Reducing incidence of timing recovery failure and avoiding resynchronization process at the receiver can improve communication performance and may enhance user experience.

The details of one or more embodiments of the subject matter described in this specification are set forth in the accompanying drawings and the description below. Other features, aspects, and advantages of the subject matter will become apparent from the description, the drawings, and the claims.

DESCRIPTION OF DRAWINGS

Like reference numbers and designations in the various drawings indicate like elements.

DETAILED DESCRIPTION

Figure 1:
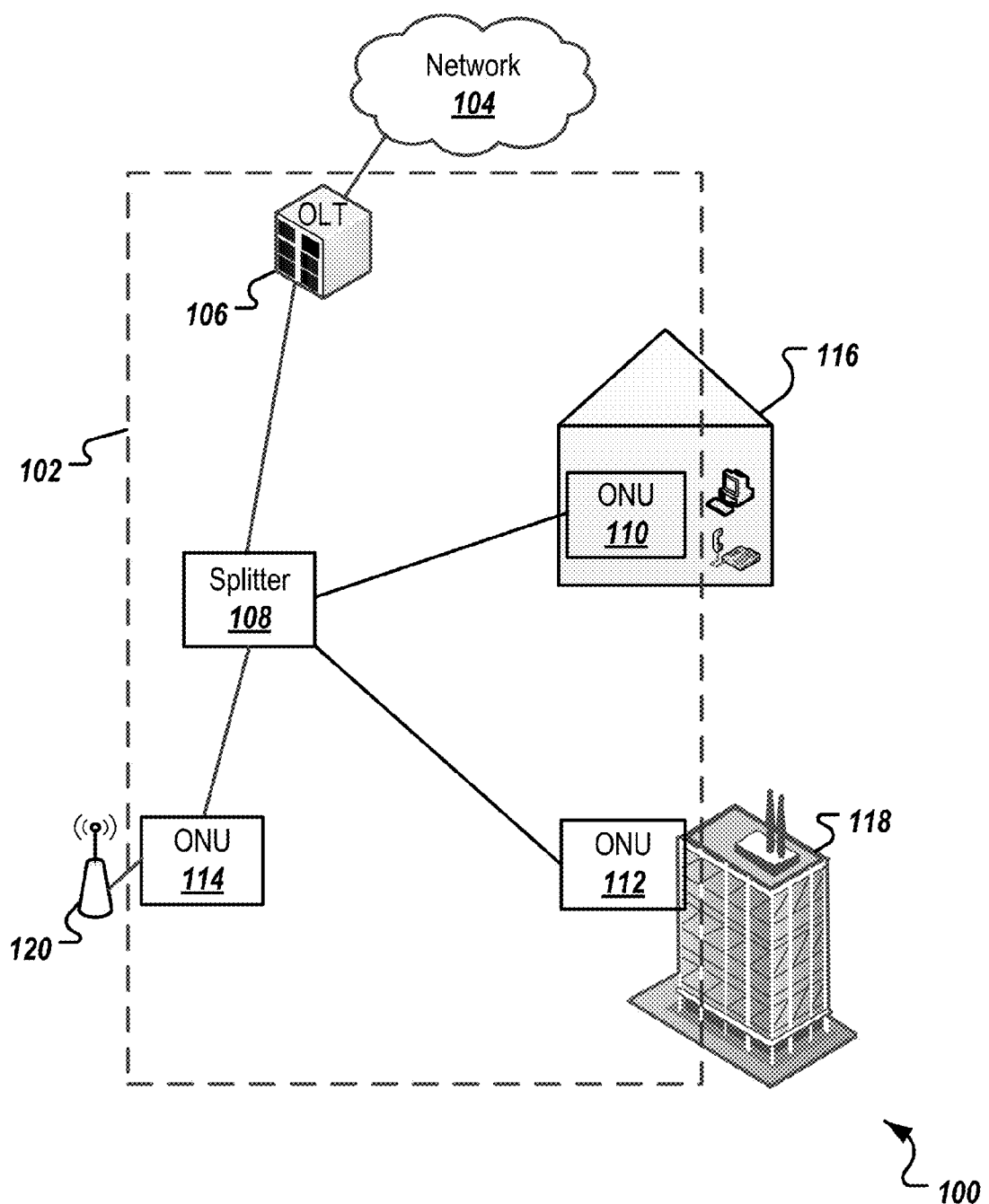
FIG. 1 is a block diagram illustrating an example optical networking environment for automatically injecting symbol errors into a data stream prior to transmitting the data stream.

The present disclosure describes methods, systems, and apparatus for automatically injecting symbol errors into a data stream prior to transmitting the data stream for timing recovery robustness. For example, a transmitter can inject symbol errors into a data stream, prior to transmitting the data stream to a receiver, upon determining that a data transition rate of the data stream exceeds a pre-specified rate that is associated with a nominal passband of the receiver. Although this disclosure refers to optical telecommunications systems for purposes of example, the subject matter of this document can be applied to other types of telecommunications systems or other systems that transmit digital data.

In a telecommunication network, data streams, especially high-speed data streams (e.g., 10 Gbps), are transmitted without an accompanying clock signal. The receiver generates a clock from an approximate frequency reference of a received data stream, and then phase-aligns to transitions in the received data stream with a phase-locked loop (PLL) to recover data from the received data stream. This process is commonly known as clock and data recovery (CDR). Timing recovery failure at the receiver not only causes data recovery failure, but also causes the receiver unable to maintain synchronization with the transmitter. In some cases, the receiver may go offline and come back online again to resynchronize with the transmitter. This causes severe service disruptions to end users and results in unpleasant customer experience for the end users. High frequency content of data (e.g., data with 10101010 kinds of patterns) in the received data stream can result in an approximate frequency reference that exceeds a nominal operating range of the receiver and makes timing recovery at the receiver difficult. This disclosure describes techniques for improving performance of a timing recovery circuit by intentionally adding errors to data streams to avoid high-loss transmission frequencies. In some implementations, the errors are added on an FEC codeword basis so that the receiver can correct the added errors to recover data while maintaining timing recovery accuracy.

The disclosed subject matter addresses problems that arise when a data transition rate of a data stream exceeds a nominal data rate of a receiver. For example, a data stream with alternating 0 and 1 (e.g., high transition density) may cause the frequency of the data stream to be greater than the nominal operating bandwidth of the receiver. If the transitions persist for a threshold period, the CDR of the receiver may fail and, in some cases, cause the receiver to enter into a resynchronization process with the transmitter. In the present disclosure, the transmitter monitors data streams to be transmitted to the receiver during data retrieval and serialization process. If the transmitter detects that a data transition rate of a data stream exceeds a pre-specified rate that is associated with a nominal passband of the receiver, the transmitter intentionally injects symbol errors into the data stream prior to transmitting the data stream. The injected symbol errors interrupt the high frequency data pattern, reduce the data transition rate of the data stream, and can provide timing recovery robustness for the receiver (e.g., by shifting the frequency of the data transitions closer to the nominal operating frequency of the receiver). Using the techniques discussed in this document, timing recovery failure caused by high frequency content of data can be prevented. Any telecommunications devices with limited operating bandwidth can benefit from the subject matter described in this document.

In some implementations, a protocol-specified FEC function is used for correcting errors in data transmission over unreliable or noisy communication channels. With the FEC function implemented, a few injected symbol errors can be corrected by the receiver and can provide timing recovery robustness without losing the data stream. For example, in 10G-PON (e.g., XG-PON), Reed-Solomon coding is specified, in which data is encoded with Reed-Solomon coding resulting in a 248-byte codeword with 32 parity bytes in it. Theoretically, a maximum of 16 error bytes (e.g., half the number of parity bytes) can be injected in a codeword and the codeword can still be corrected at the receiver. Choosing an appropriate byte boundary to substitute data with error bytes of a number of transitions is advantageous, because the Reed-Solomon code is insensitive to the number of bit errors within a byte. As many errors as necessary may be introduced within a byte to reduce the transition rate to keep the clock recovery accurate. For example, for an 8-byte high frequency content of data in a codeword, not including any parity byte, one error byte of low transition rate (e.g., a byte providing symbol values of 00000001) can be injected to replace the fourth byte of the 8-byte high frequency content of data. Forcing errors in a few bytes per codeword may greatly reduce the incidence of timing recovery failure, while having little effect on coding gain. As a result, the Reed-Solomon error correcting will repair the data corruption, but the data corruption will make it easier to recover timing. This may result in an overall performance gain, especially in systems that use a high number of parity bytes. In some implementations, error bytes injected in a codeword may exceed the theoretical maximum number for maintaining synchronization purpose, even though the codeword cannot be corrected (e.g., lost) at the receiver.

Turning to the illustrated embodiment, FIG. 1 is a block diagram illustrating an example optical networking environment 100 for automatically injecting symbol errors into a data stream prior to transmitting the data stream. As illustrated in FIG. 1, the environment 100 includes a passive optical network (PON) 102 that connects users to a network 104. In some implementations, the environment 100 may include additional and/or different components not shown in the block diagram, such as one or more active optical networks (AONs), another type of network that provides network services (e.g., ADSL2+, VDSL2, etc.), or a combination of these and other technologies. In some implementations, components may also be omitted from the environment 100.

As illustrated, the PON 102 includes an OLT 106 at a service provider's central office (or other distribution point), a splitter 108, an ONU 110 near residential locations 116, an ONU 112 near business locations 118, and an ONU 114 near wireless communications equipment 120. Using a splitter 108, the OLT 106 is coupled to a number of ONUs 110, 112, and 114 (also referred to as optical network terminals (ONTs)), which are located near end users, thereby forming a point-to-multipoint network. For example, in the case of Gigabit Passive Optical Network (GPON), a single OLT port can connect to 64 different ONUs through the splitter 108.

The OLT 106, as a network distribution element, provides an interface between the PON 102 and the network 104, and serves as the service provider's endpoint of the PON 102. The OLT 106 transmits downstream data traffic to ONUs (e.g., ONUs 110, 112, and 114), and receives upstream data traffic from the ONUs.

Each ONU can include, or otherwise be coupled to, one or more customer-premises equipment (CPE) or subscriber devices (e.g., CPE modems). For example, the ONU 110 is a device that terminates the PON 102 at the customer end, and provides a service connection to a user living in the residential locations 116. The ONU 110 terminates optical fiber transmission and can transform incoming optical signals into electrical signals, adapted to subscriber devices. As a result, ONUs can provide network services, for example, to residential locations 116, business locations 118, or other forms of communications infrastructure, such as wireless communications equipment 120.

In some situations, optical components (e.g., photodiode and TIA as discussed in more detail in FIG. 3 below), that are only rated to support 2.5 Gbps data rates are used for ONUs to operate in a 10 Gbps PON at a lower cost than components specifically designed for 10 Gbps rates. In the 10 Gbps PON, an OLT can connect to 64 ONUs or more, depending on link budget. When timing recovery problems arise due to high frequency content of data transmitted by the 10 Gbps OLT, upgrading the OLT to fix the problem appears to be a cost-efficient way. Upgrading or replacing all 64 ONUs near different end user locations not only is expensive (both in capital costs and labor), but also can lead to network downtime, potentially lost revenues, and potential customer satisfaction issues (e.g., due to downtime and/or delays in providing the service). Since the low cost ONU components have a nominal data rate of 2.5 Gbps, that is less than a nominal data rate of the 10 Gbps OLT, when data sent by the 10 Gbps OLT contains high frequency content of data, the high frequency content of data is outside of the nominal range of the optical components of the ONUs. For example, a non-return-to-zero (NRZ) line code with high frequency content of data (e.g., long runs of alternating 0 and 1), transmitted at 10 Gbps, is essentially a 5 GHz Sine wave. As discussed with reference to FIG. 4, the ONUs with 2.5 Gbps optical components may have an upper cutoff frequency well below 5 GHz. The high frequency content of data may result in a signal frequency outside of the passband of the ONUs. The received signal strength at 5 GHz can be attenuated by 15 to 20 dB comparing to signal strength that is received within the passband. As a result, the ONUs may not be able to accurately recover the clock signal from the attenuated signal and lose synchronization with the 10 Gbps OLT. By the 10 Gbps OLT injecting error symbols into the high frequency content of data as described in the present disclosure, the frequency of the signal may be reduced. This can lower the frequency of the data towards (or within) the nominal passband of the ONUs or, at least, limits the time the frequency of the data being outside of the nominal passband of the ONUs to a short period. As a result, the ONUs can keep timing recovery accuracy when receiving high frequency content of data using low data rate optical components.

The network 104 facilitates wireless or wireline communications between the components of the PON 102 with any other local or remote computer, such as additional PONs, servers, or other devices communicably coupled to the network 104, including those not illustrated in FIG. 1. As illustrated in FIG. 1, the network 104 is depicted as a single network, but may be comprised of more than one network without departing from the scope of this disclosure.

In some implementations, one or more of the illustrated components may be included within network 104 as one or more cloud-based services or operations. The network 104 may be all or a portion of an enterprise or secured network, while in another case, at least a portion of the network 104 may represent a connection to the Internet, a public switched telephone network (PSTN), a data server, a video server, or additional or different networks. In some implementations, a portion of the network 104 may be a virtual private network (VPN). Further, all or a portion of the network 104 can comprise either a wireline or wireless link. Example wireless links may include 802.11ac/ad/af/a/b/g/n, 802.20, WiMax, LTE, and/or any other appropriate wireless link. In other words, the network 104 encompasses any internal or external network, networks, sub-network, or combination thereof, operable to facilitate communications between various computing components, inside and outside the environment 100. The network 104 may communicate, for example, Internet Protocol (IP) packets, Frame Relay frames, Asynchronous Transfer Mode (ATM) cells, voice, video, data, and other suitable information between network addresses. The network 104 may also include one or more local area networks (LANs), radio access networks (RANs), metropolitan area networks (MANs), wide area networks (WANs), all or a portion of the Internet, and/or any other communication system or systems at one or more locations.

Figure 2:
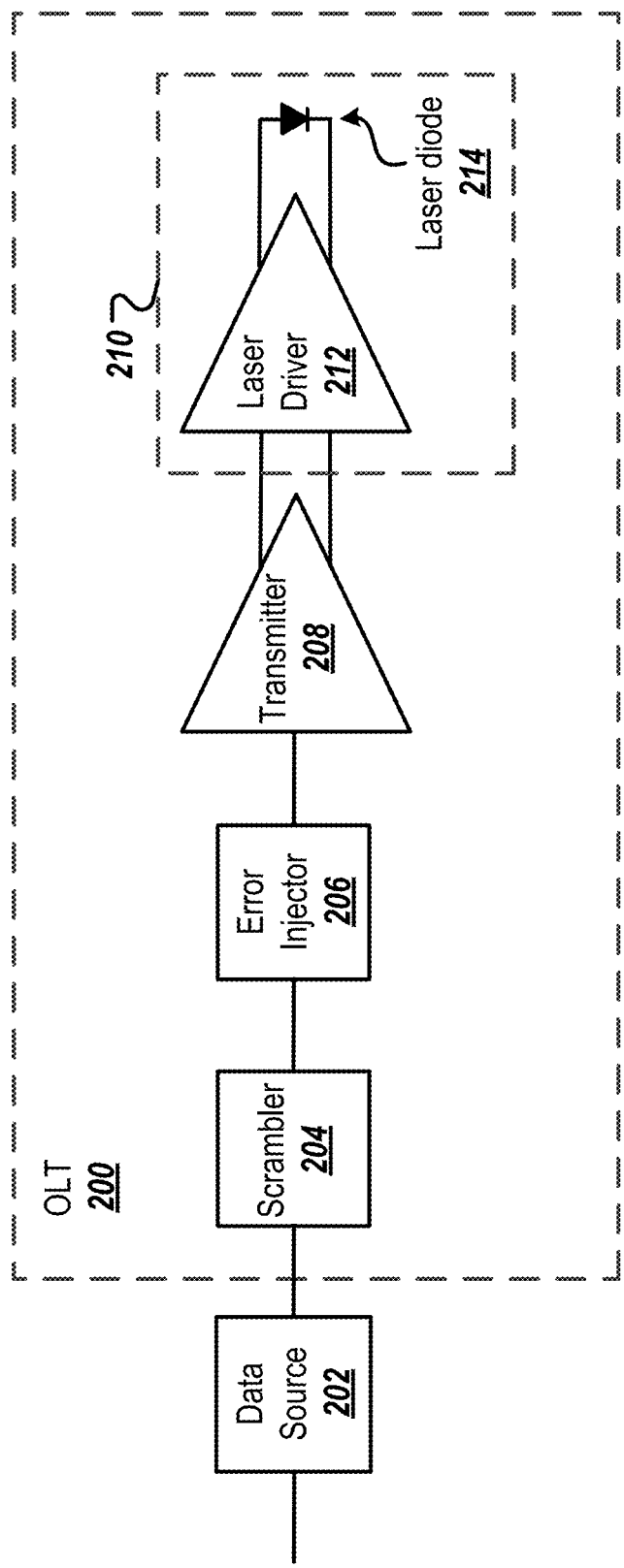
FIG. 2 is a block diagram of an example OLT transmitter.

FIG. 2 is a block diagram of an example OLT transmitter 200. In some implementations, the OLT transmitter 200 may include additional and/or different components not shown in the block diagram. Components may also be omitted from the OLT transmitter 200. The components illustrated in FIG. 2 may be similar to or different from those described in FIG. 1.

As illustrated in FIG. 2, the OLT transmitter 200 receives data streams from a data source 202 separated from the OLT transmitter 200. In some other implementations, the data source 202 is included in the OLT transmitter 200. The OLT transmitter 200 includes a scrambler 204, an error injector 206, a transmitter 208, and a laser circuit 210. In some implementations, one or more components of the OLT transmitter 200 are integrated in a field-programmable gate array (FPGA).

As illustrated, the OLT transmitter 200 includes a scrambler 204. The purpose of the scrambler 204 is to randomize the output of the data source 202 to eliminate low frequency content of data (e.g., long runs of 0s and/or long runs of 1s). The scrambler 204 is specified by standard communication protocols to fill the low frequency content of data with sufficient transitions for a receiver's clock to maintain synchronization, avoiding channel operation below the low frequency cutoff (406 in FIG. 4). In principle, the disclosed subject matter could also be used to introduce intentional transitions to reduce long runs of 0s or is that remain in the scrambler output data pattern.

As illustrated, the OLT transmitter 200 includes an error injector 206. The error injector 206 can be configured to monitor data streams from the scrambler 204 for high frequency content of data (e.g., long runs of alternating logical 0's and 1's) that may cause timing recovery failure at a receiver. The error injector 206 can be configured to automatically inject error symbols into the high frequency content of data, to reduce transition density of the high frequency content of data. As a result, when the high frequency content of data is outside of the nominal range of the receiver (or at least a specified amount higher than the nominal range of the receiver), the error injector can inject symbol errors that lower the frequency of the data towards (or within) the nominal passband of the receiver. The injected symbol errors will help the receiver recover clock and data signal from the high frequency content of data, as illustrated and discussed in FIG. 4 below. In some implementations, the error injector 206 can include an encoder that applies FEC coding to the data streams before injecting error symbols. With the FEC coding implemented, the injected symbol errors can be corrected by the receiver, while keeping timing recovery accurate.

As illustrated, the OLT transmitter 200 includes a transmitter 208 and a laser circuit 210. The transmitter 208 can be configured to transmit data streams from the error injector 206 to the laser circuit 210. The laser circuit 210 can be configured to transform electrical signals from the transmitter 208 into optical signals. As illustrated, the laser circuit 210 includes a laser driver 212 and a laser diode 214. The laser driver 212 can have a specified nominal operating range and is configured to drive the laser diode 214. The laser diode 214 can have a specified nominal operating range and transmits the optical signals, over an optical fiber, to a receiver. For example, if the OLT transmitter 200 can support 10 Gbps data rates, both the laser driver 212 and the laser diode 214 can have a specified nominal operating range of 10 Gbps.

Additional components (not shown in FIG. 6) may be added to the example OLT transmitter 200. For example, an encoder (not shown) may be placed between the scrambler 204 and the error injector 206. In some implementations, the encoder converts data streams from the scrambler 204 into FEC codewords and feeds the FEC codewords to the error injector 206. In some implementations, the encoder also feeds a start indicator and an end indicator for each FEC codeword to the error injector 206. In some implementations, the encoder also feeds a start indicator and an end indicator, for each data symbol, in each FEC codeword to the error injector 206. In some implementations, the encoder is a Reed-Solomon encoder.

Figure 3:
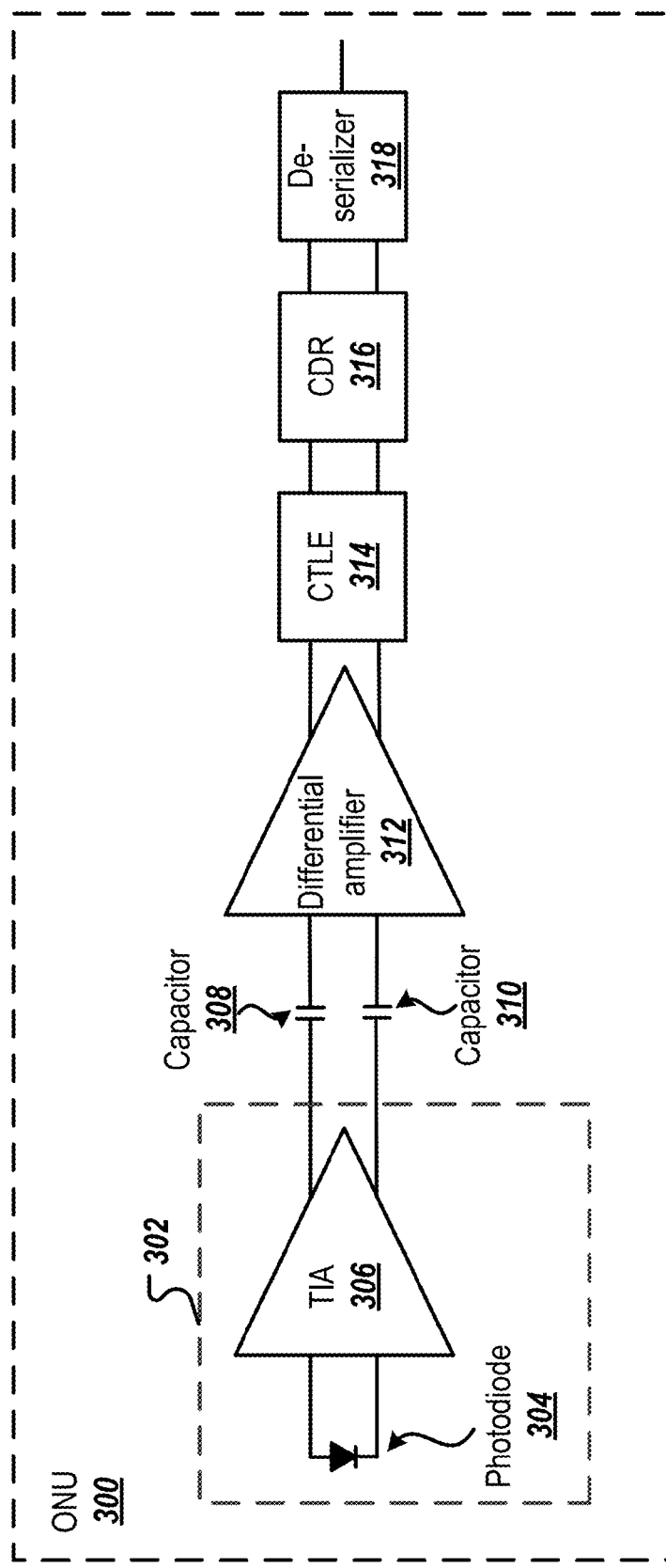
FIG. 3 is a block diagram of an example ONU receiver.

FIG. 3 is a block diagram of an example ONU receiver 300. In some implementations, the ONU receiver 300 may include additional and/or different components, not shown in the block diagram. Components may also be omitted from the ONU receiver 300. The components illustrated in FIG. 3 may be similar to or different from those described in FIG. 1.

As illustrated in FIG. 3, the ONU receiver 300 includes a receiver optical component 302 (e.g., a receiver optical sub-assembly (ROSA)). The receiver optical component 302 includes a reverse biased photodiode 304 and a trans-impedance amplifier (TIA) 306. In operation, the receiver optical component 302 receives an optical signal as input, and outputs an electric signal. Generally, the receiver optical component 302 has a specified operational range (e.g., specified maximum data rate) that is based on the components (e.g., the photodiode 304 and the TIA 306) used to implement the receiver optical component 302. For example, one receiver optical component can have a specified operational range of 2.5 Gbps, while another receiver optical component may have a specified operational range of 10 Gbps. When the specified operational range of a given receiver optical component is exceeded, the quality of the electrical signals output by the receiver optical component will degrade, as discussed with reference to FIG. 4 below. For example, when the data transition rate of optical signals received by the receiver optical component 302 exceed its specified data rate (e.g., a nominal data rate of 2.5 Gbps), an "eye opening" of the electrical signal output from the receiver optical component 302 will close. At some point beyond the specified data rate (e.g., at a data rate corresponding to frequency 412 in FIG. 4), the "eye opening" of the electrical data output from the receiver optical component 302 closes to the point that the electrical output of the receiver optical component 302 can no longer be used to recover clock and data from the signal received by the receiver optical component 302.

As illustrated, the TIA 306 is connected to a differential amplifier 312, through capacitors 308 and 310, which protect the electronical components of the ONU receiver 300. The differential amplifier 312 can be configured to increase amplitude of the TIA 306 and output a differential electrical signal. The output of the differential amplifier 312 is coupled to a continuous time linear equalizer (CTLE) 314. The CTLE 314 can be configured, for example, to whiten the noise of the electrical signals output by the differential amplifier 312, which increases the ability of the CDR 316 to recover clock and data signals output by the differential amplifier 312.

When the quality of the electrical signals output by the receiver optical component 302 is degraded beyond a certain point (e.g., less than a specified eye opening), the CTLE 314 is unable to converge automatically. For example, when the data transition rate of a signal received by the receiver optical component 302 exceeds the specified data rate for the receiver optical component 302 (e.g., frequency 412 in FIG. 4), the CTLE 314 will generally be unable to converge automatically. As a result, the CDR 316 may fail to recover clock and data signals.

As illustrated in FIG. 3, the ONU receiver 300 includes a CDR 316. Since high speed serial interfaces usually do not have any accompanying clock, the CDR 316 is needed to recover a sampling clock in order to sample the data on serial lines. To recover the sampling clock, the CDR 316 needs a reference clock of approximately the same frequency, and phase align the reference clock to the transitions on the incoming data stream (e.g., clock recovery). Sampling the incoming data signal with the recovered clock can generate a bit stream of data (e.g., data recovery). The CDR 316 is configured to recover data from incoming data stream without any bit errors due to over/under sampling. As illustrated and discussed in FIG. 4 below, the CDR 316 may operate better when the frequency corresponding to the data transitions are within the nominal passband of the receiver. The CDR 316 may work and still be able to recover clock and data when the receiver operates outside its nominal passband for a period of time. However, when the duration becomes longer, or the signal frequency gets higher, the signal strength attenuates dramatically and eventually renders the receiver unable to recover. For example, a 2.5 Gbps ONU, discussed with reference to FIG. 1, may withstand 100 bits (or some other number of bits) of high frequency content of data without losing timing recovery accuracy.

As illustrated in FIG. 3, the electrical output of the CDR 316 is then passed to a de-serializer 318 for extracting data from the received data streams.

Additional components (not shown in FIG. 3) may be added to the example ONU receiver 300. For example, an upstream communication component (e.g., a bi-directional optical sub-assembly (BOSA)) may exist to facilitate transmission of data upstream to an OLT. In some implementations, the upstream communication component includes the same components as those in the example OLT transmitter 200 (discussed with reference to FIG. 2). In some implementations, the CDR 316 is accompanied by a decision feedback equalizer (DFE) to provide nonlinear equalization to improve the error rate of the receiver in a band-limited channel.

Figure 4:
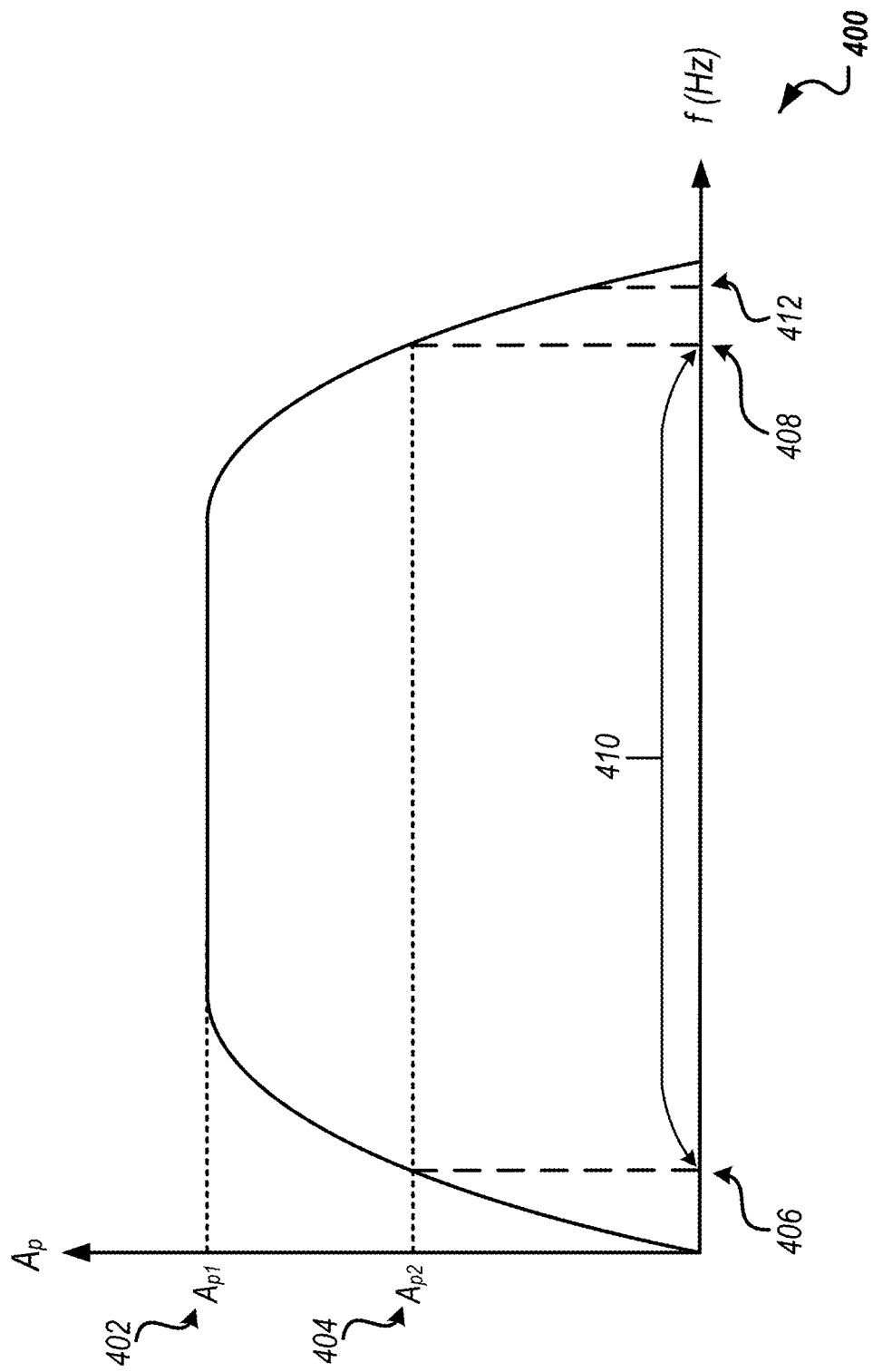
FIG. 4 is a graph showing an example frequency response of the example ONU.

FIG. 4 is a graph showing an example frequency response 400 of the example ONU receiver 300. In the example frequency response 400, the example ONU receiver 300 responds differently to input signals of different frequencies. As illustrated in FIG. 4, the passband of the example ONU receiver 300 has maximum amplitude $A_{p1}$ 402 and half the maximum amplitude is labeled as $A_{p2}$ 404, which corresponds to a lower cutoff frequency 406 of the passband 410 and an upper cutoff frequency 408 of the passband 410. The frequencies between lower cutoff frequency 406 and upper cutoff frequency 408 constitute the passband 410 of the example ONU receiver 300. Input signals within the passband 410 may pass with less attenuation than input signals outside the passband 410. For example, the strength (e.g., amplitude) of an input signal at frequency 412 may be attenuated dramatically as compared to the signal strength (e.g., amplitude) of input signals that are within the passband 410. As a result, the input signals outside of the passband 410 may not be detected correctly and may cause timing recovery failure at the CDR 316 of the example ONU receiver 300.

Generally, the nominal passband of the ONU is designed based on the nominal data rate that the ONU is built to support. For example, an ONU that is built to support a 2.5 Gbps data rate will generally have a smaller passband than an ONU that is built to support a 10 Gbps data rate. However, the actual frequency of the analog signals representing data transmitted over a network depend on the rate at which the data transitions from high to low and low to high. For example, a signal representing a long run of 0's or 1's in a data stream will have a lower frequency than a signal that represents a long run of 1-0-1-0 data transitions. As such, the actual frequency of signals representing a 10 Gbps data stream may only occasionally approach their highest frequency. Further, symbol errors can be injected into a long run of 1-0-1-0 data transitions (or other higher frequency data transitions) so that the frequency of the input signal representing these data transitions can be brought back within the passband 410 of an ONU that was built for a lower data rate (e.g., 2.5 Gbps), such that the higher data rate stream (e.g., 10 Gbps data stream) can be recovered by a lower rated ONU (e.g., a 2.5 Gbps ONU) and the CDR 316 of the example ONU receiver 300 (e.g., having a 2.5.Gbps receiver) can accurately recover timing of a 10 Gbps data stream.

Figure 5:
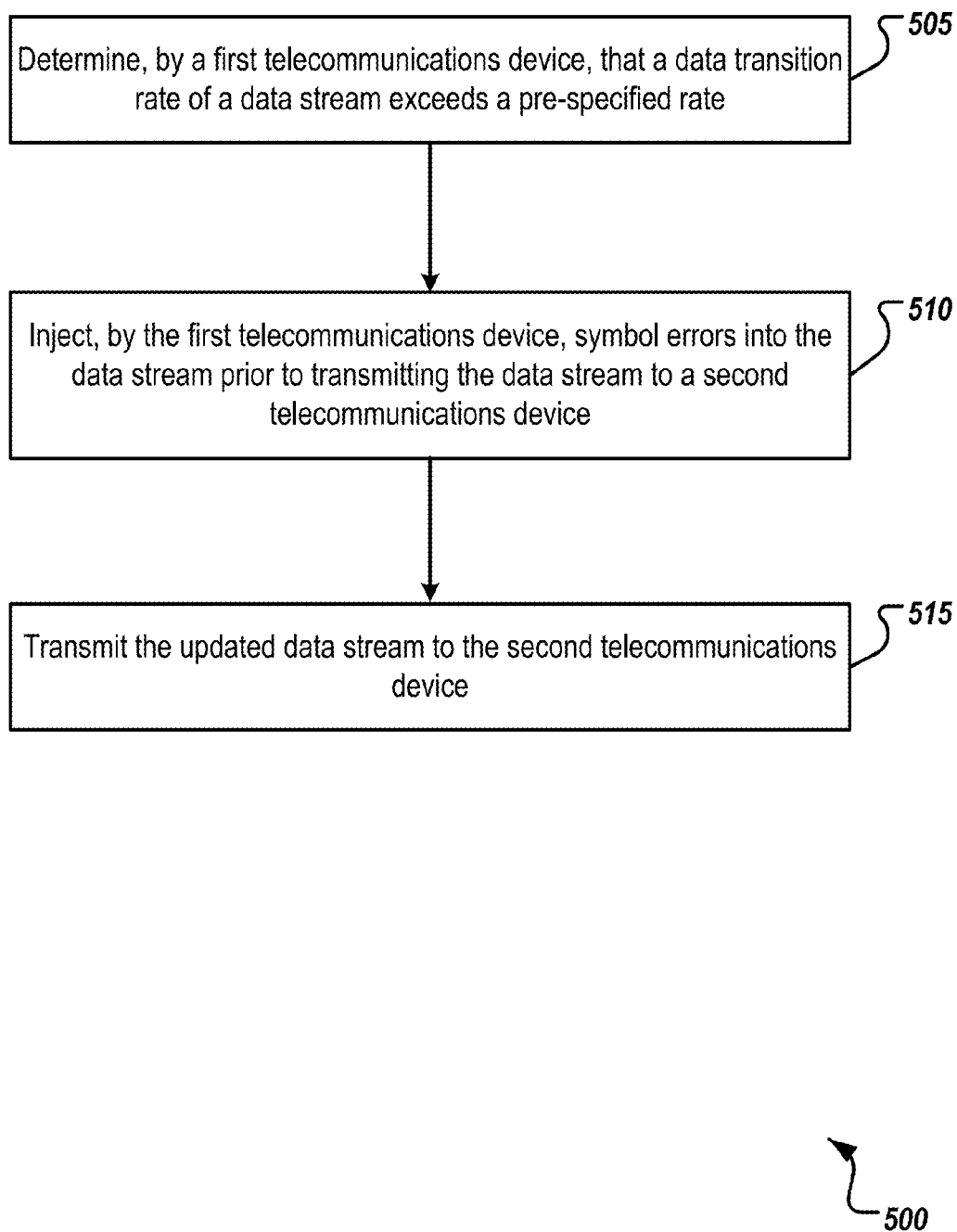
FIG. 5 is a flow chart of an example process for automatically injecting symbol errors into a data stream prior to transmitting the data stream.

FIG. 5 is a flow chart of an example process 500 for automatically injecting symbol errors into a data stream, prior to transmitting the data stream, to reduce the frequency of a signal representing the data stream. The example process 500 can be performed, for example, by one or more telecommunications devices, such as those described with reference to FIGS. 2 and 3. The example process 500 can also be implemented as instructions stored on a non-transitory, computer-readable medium that, when executed by one or more telecommunications devices, configures the one or more telecommunications devices to perform and/or cause the one or more telecommunications devices to perform the actions of the example process 500.

A data transition rate of a data stream is determined by a first telecommunications device, to exceed a pre-specified rate (505). In some implementations, the pre-specified rate is based on at least a nominal passband of a second telecommunications device. In some implementations, the nominal passband of the second telecommunication device is determined in a lab test, before the second telecommunication device is deployed. In some implementations, the lab test also determines other parameters associated with the second telecommunication device, such as how many bits of high frequency content the second telecommunication device can withstand, without losing timing recovery accuracy. In some implementations, the parameters are associated with a type and/or a manufactured date of a chip in the second telecommunications device. In some implementations, the first telecommunications device can query the second telecommunications device for the chip information to determine the nominal passband of the second telecommunication device. In some implementations, the first telecommunications device can perform an on-demand test with the second telecommunications device to determine the parameters associated with the second telecommunications device.

In response to the determination that the data transition rate exceeds the pre-specified rate, the first telecommunications device injects symbol errors into the data stream, prior to transmitting the data stream to the second telecommunications device (510). In some implementations, the symbol errors are injected into the middle of the determined data stream. In some implementations, the symbol errors are injected into an end of the determined data stream. In some implementations, the first telecommunications device changes a logical value, of one or more bits, in the data stream to inject symbol errors into the determined data stream. In some implementations, after symbol errors injection, a data transition rate of the modified data stream is less than the pre-specified rate.

The modified data stream is transmitted by the first telecommunications device to the second telecommunications device (515). In some implementations, the first telecommunications device is an OLT, with a nominal data rate of 10 Gbps, and the second telecommunications device is an ONU, with a nominal data rate of 2.5 Gbps.

The example process 500 shown in FIG. 5 can be modified or reconfigured to include additional, fewer, or different actions (not shown in FIG. 5), which can be performed in the order shown or in a different order. For example, before 505, a data stream may pass through a scrambler to fill long runs of 0s and/or long runs of is with sufficient transitions. In some implementations, one or more of the actions can be repeated or iterated, for example, until a terminating condition is reached. In some implementations, one or more of the individual actions shown in FIG. 5 can be executed as multiple separate actions, or one or more subsets of the actions shown in FIG. 5 can be combined and executed as a single action.

Figure 6:
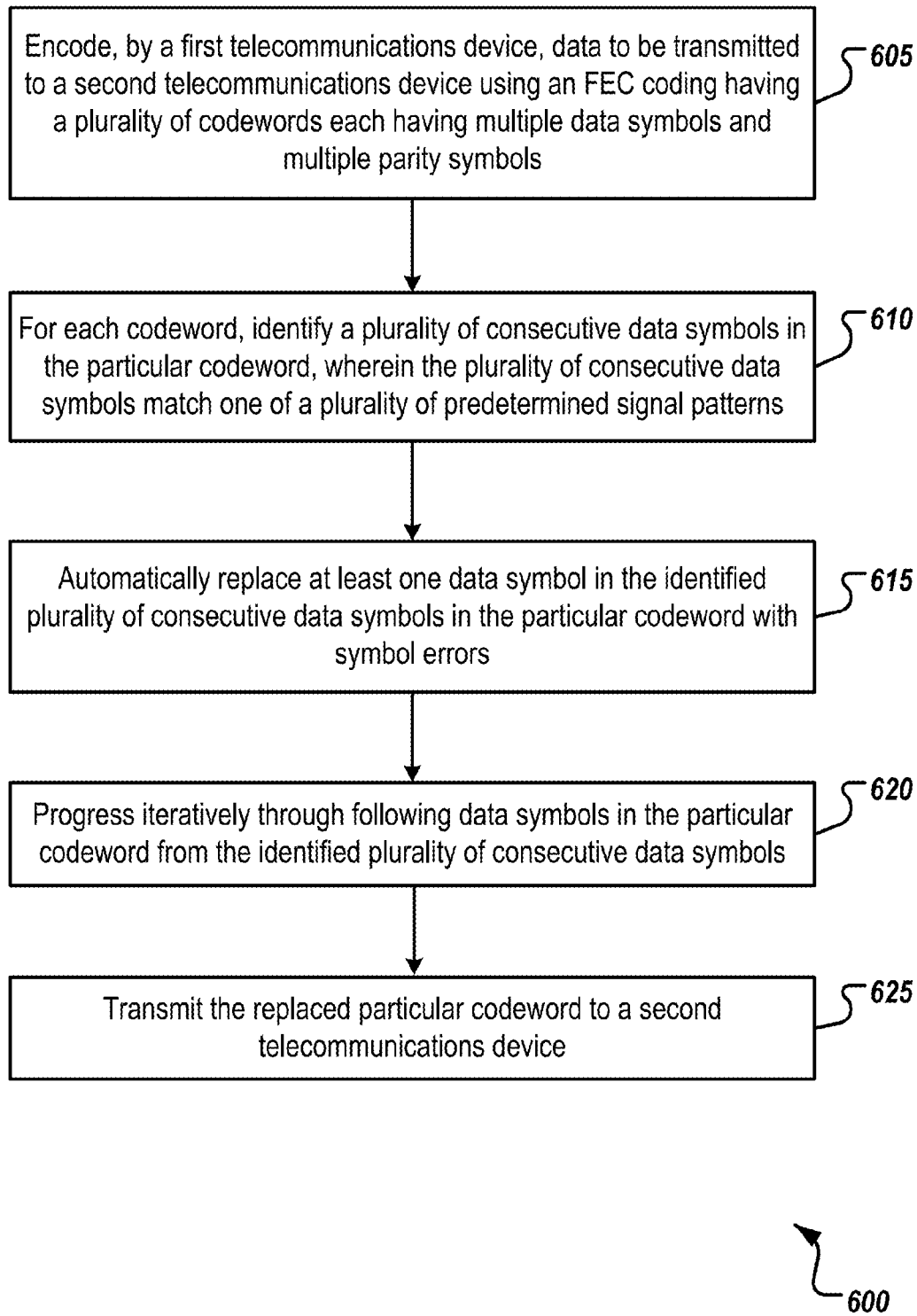
FIG. 6 is a flow chart of another example process for automatically injecting symbol errors into a data stream prior to transmitting the data stream.

FIG. 6 is a flow chart of another example process 600 for automatically injecting symbol errors into a data stream, prior to transmitting the data stream, to reduce the frequency of a signal representing the data stream. The example process 600 can be performed, for example, by one or more telecommunications devices such as those described with reference to FIGS. 2 and 3. The example process 600 can also be implemented as instructions stored on a non-transitory, computer-readable medium that, when executed by one or more telecommunications devices, configures the one or more telecommunications devices to perform and/or cause the one or more telecommunications devices to perform the actions of the example process 600.

Data to be transmitted to a second telecommunications device is encoded by a first telecommunications device using an FEC coding having a plurality of codewords, each having multiple data symbols and multiple parity symbols (605). In some implementations, the FEC coding used is Reed-Solomon coding (other coding schemes can be used). In some implementations, the FEC coding is performed by a device different than the first telecommunications device.

For each codeword, a plurality of consecutive data symbols matching one of a plurality of predetermined signal patterns are identified in the particular codeword by the first telecommunications device (610). In some implementations, the plurality of predetermined signal patterns include patterns having sequential high-low-high-low logic values. In some implementations, the plurality of predetermined signal patterns include patterns with high transition density. In some implementations, data transition rates of the plurality of predetermined signal patterns exceed a pre-specified rate that is based on at least a nominal passband of the second telecommunications device. For example, if the first telecommunications device is an OLT, with a nominal data rate of 10 Gbps, and the second telecommunications device is an ONU, with a nominal data rate of 2.5 Gbps, the pre-specified rate may be set to 2.5G per second. In some implementations, the pre-specified rate may be set to a number less than 2.5G per second. In some implementations, the pre-specified rate may be set to a number greater than 2.5G per second.

At least one data symbol in the identified plurality of consecutive data symbols in the particular codeword is automatically replaced with symbol errors (615). In some implementations, the replaced at least one data symbol is in a middle of the identified plurality of consecutive data symbols. In some other implementations, the replaced at least one data symbol is at an end of the identified plurality of consecutive data symbols. In some implementations, the first telecommunications device changes a logical value of one or more bits in the at least one data symbol, to replace the at least one data symbol with symbol errors. In some implementations, after replacing the at least one data symbol with symbol errors, the modified plurality of consecutive data symbols do not match any of the plurality of predetermined signal patterns.

The first telecommunications device automatically processes data symbols in the particular codeword for predetermined signal patterns. The first telecommunications device iterates through following data symbols in the particular codeword from the identified plurality of consecutive data symbols (620). In some implementations, a maximum number of data symbols in a codeword that can be replaced with symbol errors, is based on at least number of parity symbols in the codeword. In some implementations, each symbol has 8 bits, and the symbol errors provide symbol values of 00000000, 11111111, 00000001, or 11111110. In some other implementations, each symbol has a bit number different than 8 (e.g., 10-bit symbol used in IEEE 802.3bj).

The modified codeword is transmitted by the first telecommunications device to the second telecommunications device (625). In some implementations, the first telecommunications device is an OLT, with a nominal data rate of 10 Gbps and the second telecommunications device is an ONU, with a nominal data rate of 2.5 Gbps.

The example process 600 shown in FIG. 6 can be modified or reconfigured to include additional, fewer, or different actions (not shown in FIG. 6), which can be performed in the order shown or in a different order. For example, before 605, data may pass through a scrambler to prevent long runs of 0s and/or long runs of 1s. In some implementations, one or more of the actions can be repeated or iterated, for example, until a terminating condition is reached. In some implementations, one or more of the individual actions shown in FIG. 6 can be executed as multiple separate actions, or one or more subsets of the actions shown in FIG. 6 can be combined and executed as a single action.

While this specification contains many specific implementation details, these should not be construed as limitations on the scope of any inventions or of what may be claimed, but rather as descriptions of features specific to particular embodiments of particular inventions. Certain features that are described in this specification, in the context of separate embodiments, can also be implemented in combination or in a single embodiment. Conversely, various features that are described in the context of a single embodiment can also be implemented in multiple embodiments, separately, or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A telecommunications device comprising:
   an error injector configured to:
   determine that a data transition rate of a data stream exceeds a pre-specified rate; and
   update operations of the error injector to inject symbol errors into the data stream prior to transmitting the data stream to a second telecommunications device to reduce transition frequencies in the data stream when transmitted to the second telecommunications device, wherein the injecting is performed in response to the determination that the data transition rate exceeds the pre-specified rate; and
   a transmitter configured to transmit the data stream that includes the injected symbol errors to the second telecommunications device over a telecommunication line.

2. The telecommunications device of claim 1, further comprising an encoder configured to:
   receive data streams from a first data source;
   encode the data streams with a forward error correcting (FEC) coding having a plurality of codewords each having multiple data symbols and multiple parity symbols, wherein the data stream is part of multiple data symbols in a codeword of the plurality of codewords; and
   transmit the encoded data streams to the error injector.

3. The telecommunications device of claim 2, wherein the first data source is a scrambler, further comprising the scrambler configured to:
   receive data streams from a second data source; and
   process the received data streams to ensure a high bit transition density for the received data streams.

4. The telecommunications device of claim 2, wherein determining that the data transition rate of the data stream exceeds the pre-specified rate includes identifying a plurality of consecutive data symbols in the codeword, wherein the plurality of consecutive data symbols match one of a plurality of predetermined signal patterns.

5. The telecommunications device of claim 4, wherein the plurality of predetermined signal patterns includes patterns having sequential high-low-high-low logic values.

6. The telecommunications device of claim 4, wherein injecting the symbol errors into the data stream includes automatically replacing at least one data symbol in the identified plurality of consecutive data symbols in the codeword with the symbol errors.

7. The telecommunications device of claim 6, wherein a maximum number of injected symbol errors in the codeword is based on at least a number of parity symbols in the codeword.

8. The telecommunications device of claim 1, wherein the pre-specified rate is based on at least a nominal passband of the second telecommunications device.

9. The telecommunications device of claim 1, wherein injecting the symbol errors into the data stream includes changing a logical value of one or more bits in the data stream to reduce the transition rate of the data stream.

10. The telecommunications device of claim 1, wherein the telecommunications device is an optical line terminal (OLT) with a nominal data rate of 10 Gbps and the second telecommunications device is an optical networking unit (ONU) with a nominal data rate of 2.5 Gbps.

11. A method, comprising:
determining, by a first telecommunications device, that a data transition rate of a data stream exceeds a pre-specified rate; and
updating operations of the first telecommunications device to inject, symbol errors into the data stream prior to transmitting the data stream to a second telecommunications device to reduce transition frequencies in the data stream when transmitted to the second telecommunications device, wherein the injecting is performed in response to the determination that the data transition rate exceeds the pre-specified rate.

12. The method of claim 11, wherein the pre-specified rate is based on at least a nominal passband of the second telecommunications device.

13. The method of claim 11, wherein injecting the symbol errors into the data stream includes changing a logical value of one or more bits in the data stream to reduce the transition rate of the data stream.

14. The method of claim 11, further comprising:
encoding, by the first telecommunications device, data using a forward error correcting (FEC) coding having a plurality of codewords each having multiple data symbols and multiple parity symbols, wherein the data stream is part of multiple data symbols in a codeword of the plurality of codewords.

15. The method of claim 14, wherein determining that the data transition rate of the data stream exceeds the pre-specified rate includes identifying a plurality of consecutive data symbols in the codeword, wherein the plurality of consecutive data symbols match one of a plurality of pre-determined signal patterns.

16. The method of claim 15, wherein the plurality of predetermined signal patterns includes patterns having sequential high-low-high-low logic values.

17. The method of claim 15, wherein injecting the symbol errors into the data stream includes automatically replacing at least one data symbol in the identified plurality of consecutive data symbols in the codeword with the symbol errors.

18. The method of claim 17, further comprising:
progressing iteratively through following data symbols in the codeword from the identified plurality of consecutive data symbols; and
transmitting the replaced codeword to the second telecommunications device.

19. The method of claim 18, wherein a maximum number of injected symbol errors in the codeword is based on at least a number of parity symbols in the codeword.

20. The method of claim 11, wherein the first telecommunications device is an optical line terminal (OLT) with a nominal data rate of 10 Gbps and the second telecommunications device is an optical networking unit (ONU) with a nominal data rate of 2.5 Gbps.

21. A telecommunications system, comprising:
a first telecommunications device configured to:
determine that a data transition rate of a data stream exceeds a pre-specified rate; and
update operations of the first telecommunications device to inject symbol errors into the data stream prior to transmitting the data stream to a second telecommunications device to reduce transition frequencies in the data stream when transmitted to the second telecommunications device, wherein the injecting is performed in response to the determination that the data transition rate exceeds the pre-specified rate; and
the second telecommunications device configured to receive the data stream from the first telecommunications over a telecommunication line, wherein a nominal passband of the second telecommunications device is associated with the pre-specified rate.

22. The system of claim 21, wherein the pre-specified rate is based on at least a nominal passband of the second telecommunications device.

23. The system of claim 21, wherein injecting the symbol errors into the data stream includes changing a logical value of one or more bits in the data stream to reduce the transition rate of the data stream.

24. The system of claim 21, wherein the first telecommunications device is an optical line terminal (OLT) with a nominal data rate of 10 Gbps and the second telecommunications device is an optical networking unit (ONU) with a nominal data rate of 2.5 Gbps.

* * * * *